(12) United States Patent
Diede et al.

(10) Patent No.: US 6,198,424 B1
(45) Date of Patent: *Mar. 6, 2001

(54) MULTIPLE PROCESS PRODUCT INTERFACE DETECTION FOR A LOW POWER RADAR LEVEL TRANSMITTER

(75) Inventors: Kurt C. Diede, Apple Valley; Brian E. Richter, Bloomington, both of MN (US)

(73) Assignee: Rosemount Inc., Eden Prairie, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/234,999

(22) Filed: Jan. 21, 1999

(51) Int. Cl.[7] .............................. G01S 13/88; G01S 13/08; G01R 27/04
(52) U.S. Cl. ............................ 342/22; 342/118; 342/124; 342/175; 342/195; 73/290 R; 324/637; 324/642
(58) Field of Search .................................. 342/4, 22, 27, 342/118, 120–124, 175, 192–197, 59; 73/290 R, 304 R, 304 C, 290 B; 324/637, 642, 643, 644, 649, 658, 663, 671

(56) References Cited

U.S. PATENT DOCUMENTS

| 3,665,466 | * | 5/1972 | Hibbard ................ 342/59 |
| 3,812,422 | | 5/1974 | De Carlos . |
| 3,995,212 | | 11/1976 | Ross . |
| 4,161,731 | * | 7/1979 | Barr ..................... 342/22 |
| 5,157,337 | | 10/1992 | Neel et al. . |
| 5,327,139 | * | 7/1994 | Johnson ................ 342/22 |
| 5,500,649 | * | 3/1996 | Mowrey et al. ........ 342/22 |
| 5,609,059 | | 3/1997 | McEwan . |
| 5,610,611 | | 3/1997 | McEwan ................ 342/89 |
| 5,656,774 | | 8/1997 | Nelson et al. . |
| 5,661,251 | | 8/1997 | Cummings et al. . |
| 5,672,975 | | 9/1997 | Kielb et al. . |
| 5,726,578 | | 3/1998 | Hook . |
| 5,835,053 | * | 11/1998 | Davis ................... 342/22 |
| 5,898,308 | * | 4/1999 | Champion ............. 324/643 |

FOREIGN PATENT DOCUMENTS

0882956 A2 * 5/1998 (EP) .
0882957 A2 * 5/1998 (EP) .

OTHER PUBLICATIONS

"Novel Methods of Measuring Impurity Levels in Liquid Tanks", IEEE MTT–S International Microwave Symposium Digest, US, New York, IEEE, pp. 1651–1654.
"Micropower Impulse Radar Technology and Application", Mast et al., U.S. Dept. of Energy, Lawrence Livermore National Laboratory, UCRL–ID 130474, Apr. 15, 1998.
"Radar Level Technology Offers Accurate, Noncontact Measurements", Fred Fitch, I&CS, Jan. 1996, pp. 27–30.
"Reflex–Radar Gauging and Level Measurement for Liquids, Interface and Granular Materials", Technical Data, Dec. 1996.

* cited by examiner

*Primary Examiner*—Bernarr E. Gregory
(74) *Attorney, Agent, or Firm*—Westman, Champlin & Kelly, PA

(57) ABSTRACT

Disclosed is a low power time domain reflectometry radar (LPTDRR) level transmitter for calculating levels of first and second products in a tank. A termination extends into the first and second products in the tank. A pulse generator transmits a pulse along the termination into the first and second products. A pulse receiver receives first and second reflected wave pulses corresponding to reflection of a first portion of the transmit pulse at a first product interface and reflection of a second portion of the transmit pulse at a second product interface, respectively. A threshold controller generates a first threshold for detection of the first reflected wave pulse and a second threshold for detection of the second reflected wave pulse. A dielectric constant calculator determines a dielectric constant of the first product as a function of the first reflected wave pulse. A level computer calculates levels of the first and second products.

15 Claims, 9 Drawing Sheets

MULTIPLE PROCESS PRODUCT INTERFACE DETECTION FOR A LOW POWER RADAR LEVEL TRANSMITTER

CROSS REFERENCE TO RELATED APPLICATIONS

This application is related to U.S. application Ser. No. 09/235,114, filed Jan. 21, 1999 entitled "MEASUREMENT OF PROCESS PRODUCT DIELECTRIC CONSTANT USING A LOW POWER RADAR LEVEL TRANSMITTER".

BACKGROUND OF THE INVENTION

The process control industry employs process variable transmitters to monitor process variables associated with substances such as solids, slurries, liquids, vapors, and gasses in chemical, pulp, petroleum, pharmaceutical, food and other processing plants. Process variables include pressure, temperature, flow, level, turbidity, density, concentration, chemical composition and other properties. A process variable transmitter can provide an output related to the sensed process variable over a process control loop to a control room, such that the process can be monitored and controlled.

The process control loop can be a two-wire 4–2 mA process control loop. With such a process control loop, the energization levels are low enough that even under fault conditions the loop generally will not contain enough electrical energy to generate a spark. This is particularly advantageous in flammable environments. Process variable transmitters can sometimes operate on such low energy levels that they can receive all electrical power from the 4–20 mA loop. The control loop may also have digital signals superimposed on the two-wire loop according to a process industry standard protocol such as the HART® digital protocol.

Low Power Time Domain Reflectometry Radar (LPTDRR) instruments have been used recently to measure the level of process products (either liquids or solids) in storage vessels. In Time Domain Reflectometry, electromagnetic energy is transmitted from a source, and reflected at a discontinuity. The travel time of the received pulse is based on the media through which it travels. One type of LPTDRR is known as Micropower Impulse Radar (MIR), which was developed by Lawrence Livermore National Laboratory.

Low power radar circuits are generally capable of detecting the level of one product in a tank at a time. However, frequently, a storage tank contains multiple products layered on top of one another. This creates multiple interfaces between products having different dielectric constants at which the transmitted microwaves can be reflected. For example, in a tank having a water based material and an oil based material, there will typically be two interfaces, one between the air and the oil and one between the oil and the water based material. Sometimes limited intermixing occurs adjacent the product interface. Conventional low power radar level transmitters have been unable to detect both product interfaces, and have thus been unable to detect the level of both products without substantial user supplied dielectric constant data. Further, if the dielectric constants of the process products change, they must be re-entered, or error may be introduced into the system.

SUMMARY OF THE INVENTION

Multiple process product interface detection for a low power radar level transmitter is disclosed. A dielectric constant of a first product is calculated in order to calculate levels of the first and second products in a tank. A termination extends into the first and second products in the tank. A transmit pulse generator transmits a pulse along the termination into the first and second products. A low power time domain reflectometry radar (LPTDRR) pulse receiver receives the first and second reflected wave pulses corresponding to reflection of a first portion of the transmit pulse at a first product interface and to reflection of a second portion of the transmit pulse at a second product interface, respectively. A threshold controller generates a first threshold for detection of the first reflected wave pulse and a second threshold for detection of the second reflected wave pulse. A dielectric constant calculator calculates a dielectric constant of a first product as a function of a first reflected wave pulse. A level computer computes levels of the first and second products.

DETAILED DESCRIPTION OF THE PREFERRED EMBODIMENTS

Figure 1:
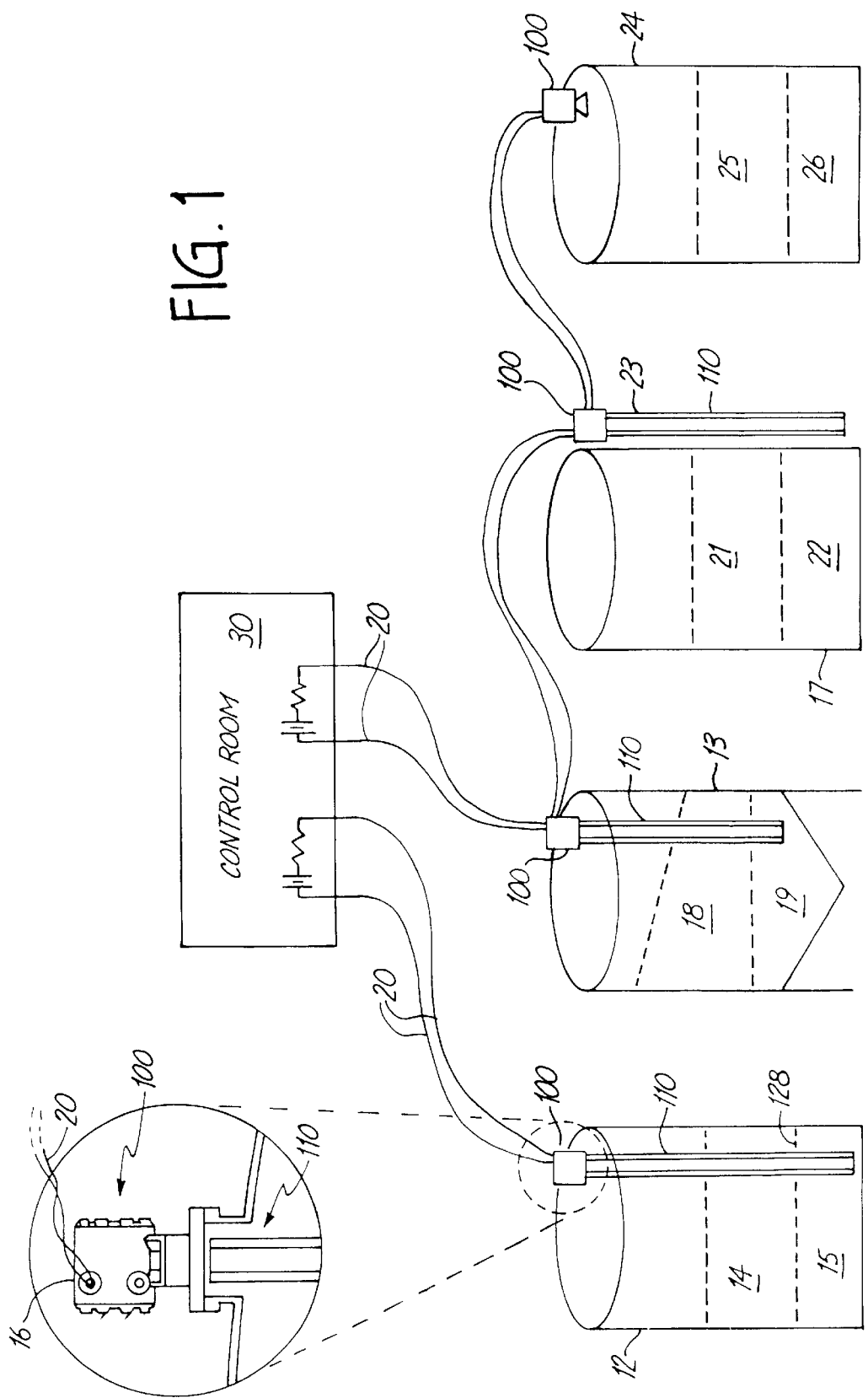
FIG. 1 is a diagram of a microwave level transmitter illustrating the environment of embodiments of the invention.

FIG. 1 is a diagram illustrating level transmitters 100 operating in the environment of being mounted to storage tanks 12, 13, 17, 24 containing process products positioned on top of one another. As illustrated, tank 12 contains first product 14 positioned on top of second product 15. Level transmitters 100 include housings 16 and terminations 110. Transmitters 100 are coupled to process control loops 20, and transmit information related to heights of the process products over loop 20 to control room 30 (which is modeled as voltage sources and resistances) or to other devices (not shown) coupled to process control loops 20. Loops 20 are sources of power for transmitters 100 and can use any industry standard communications protocol such as 4–20 mA, Foundation™ Fieldbus, or HART®. As low power radar transmitters, transmitters 100 can be completely powered by energy received over a 4–20 mA process control loop.

FIG. 1 illustrates various applications in which radar level transmitters are useful. For example, process products 14 and 15 in tank 12 are fluids, while process products 18 and 19 in tank 13 are solids. Process products 21 and 22 in tank 17 are fluids the levels of which are communicated to tube 23 into which one of terminations 110 extends. Further, tank 24 is shown containing products 25 and 26, and having a radiative-type termination mounted on top of thank 24. Although tanks 12, 13, 17 and 24 are shown in FIG. 1, the embodiments of the invention may be practiced without tank such as in a lake or reservoir.

Figure 2:
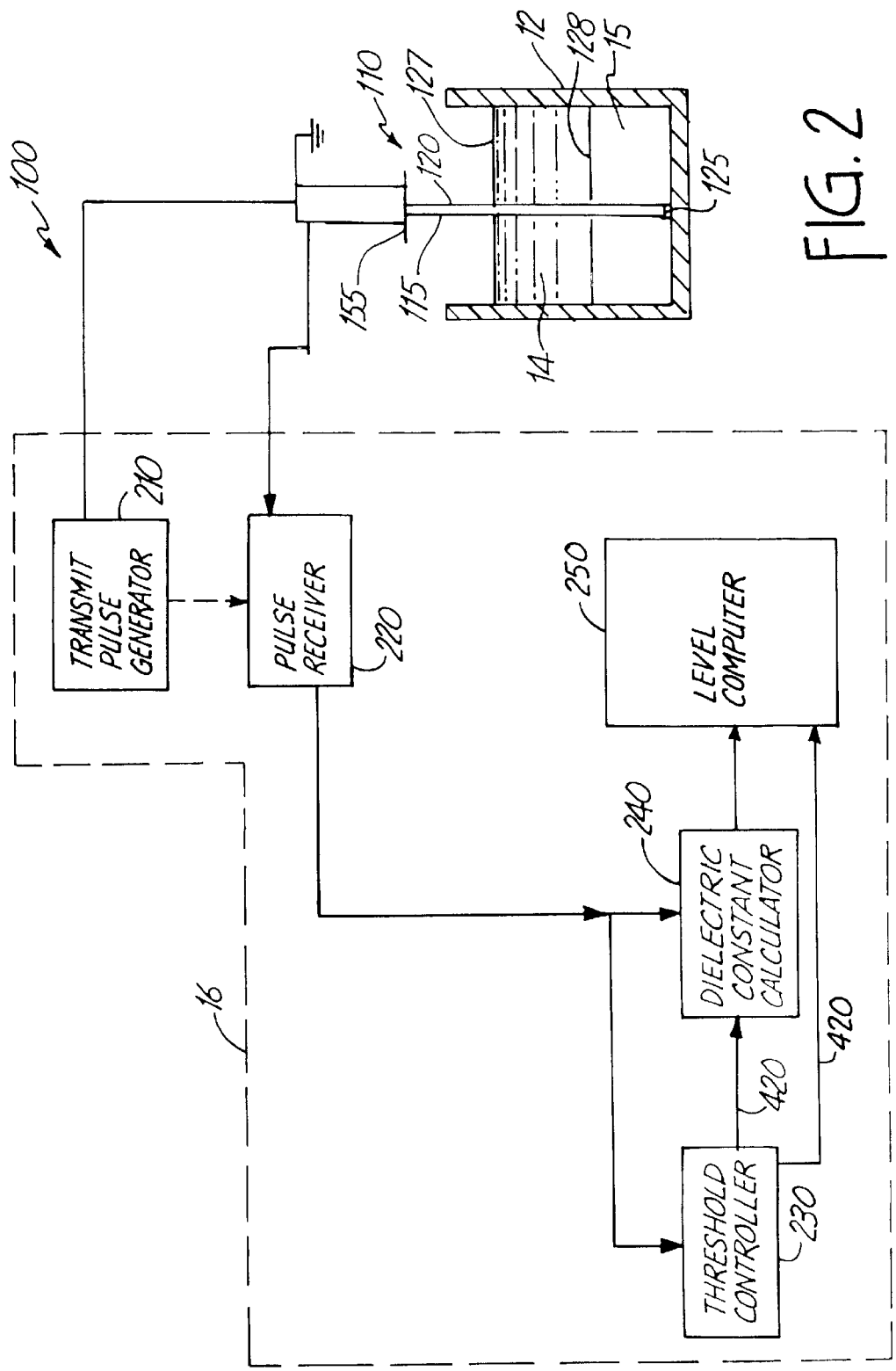
FIG. 2 is a block diagram illustrating circuitry of an embodiment of the invention.
Figure 3:
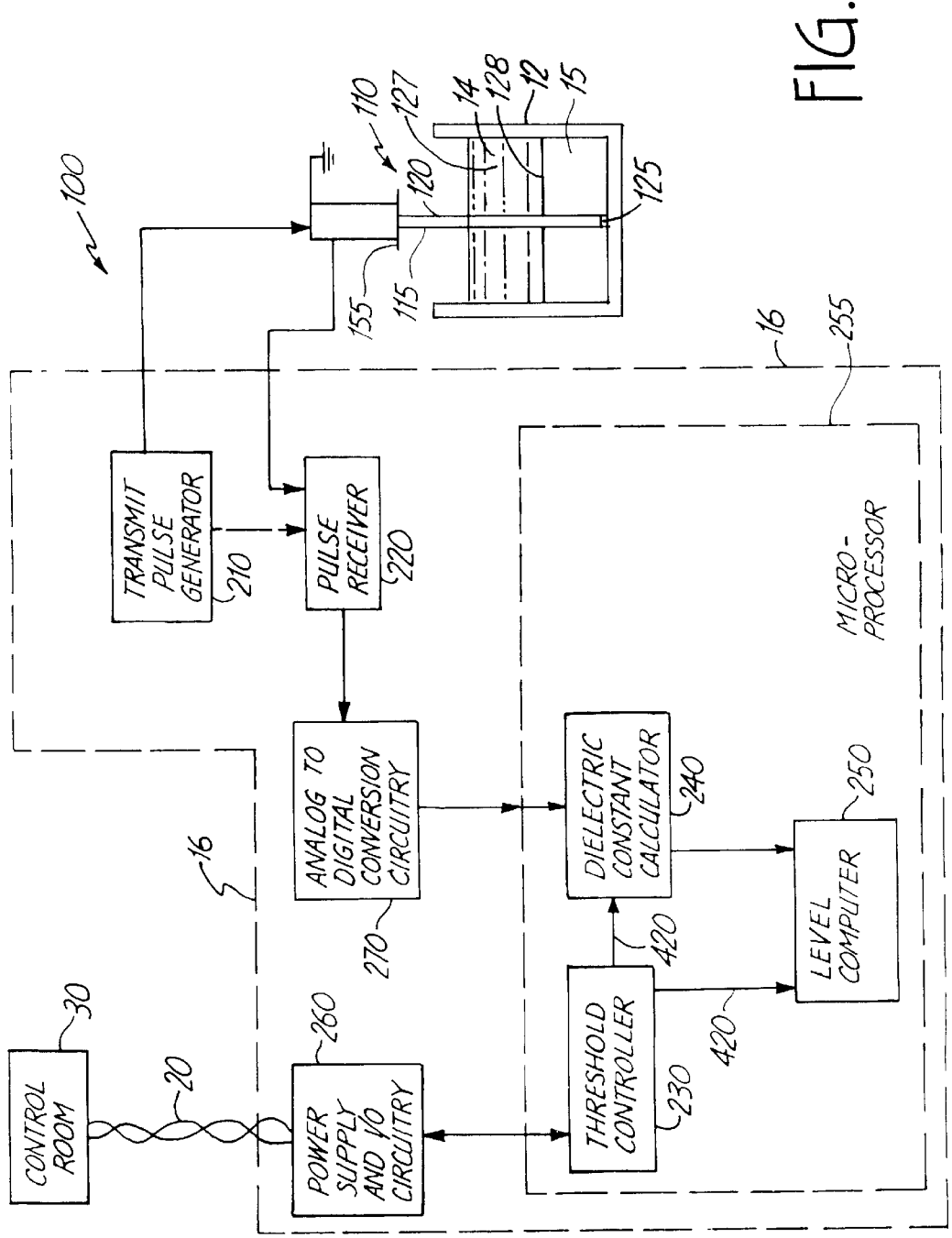
FIGS. 3 is a block diagram illustrating circuitry of an alternate embodiment of the invention.
Figure 4:
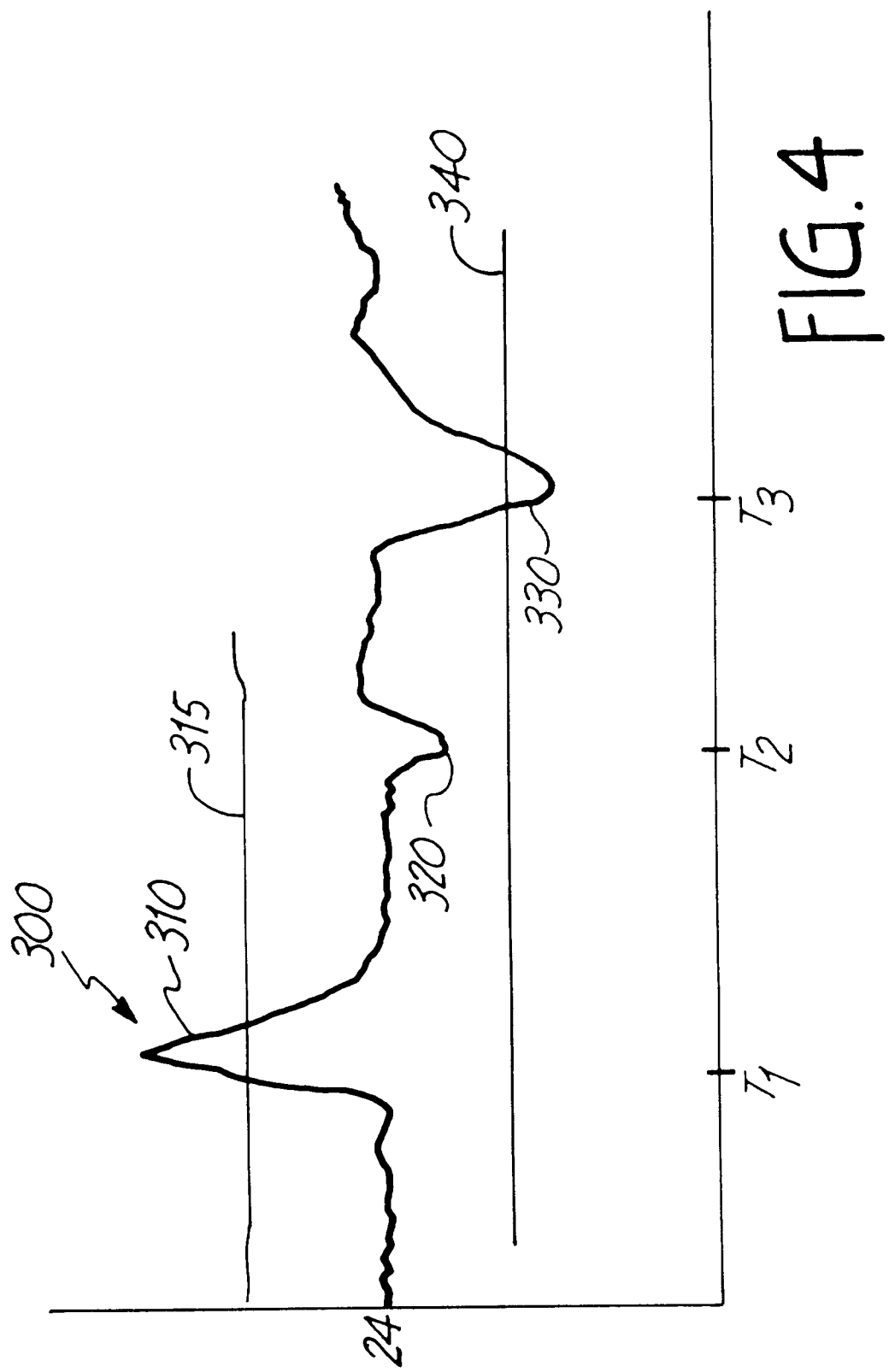
FIGS. 4 and 5 are plots illustrating Low Power Time Domain Reflectometry Radar (LPTDRR) equivalent time waveform controllable thresholds.
Figure 5:
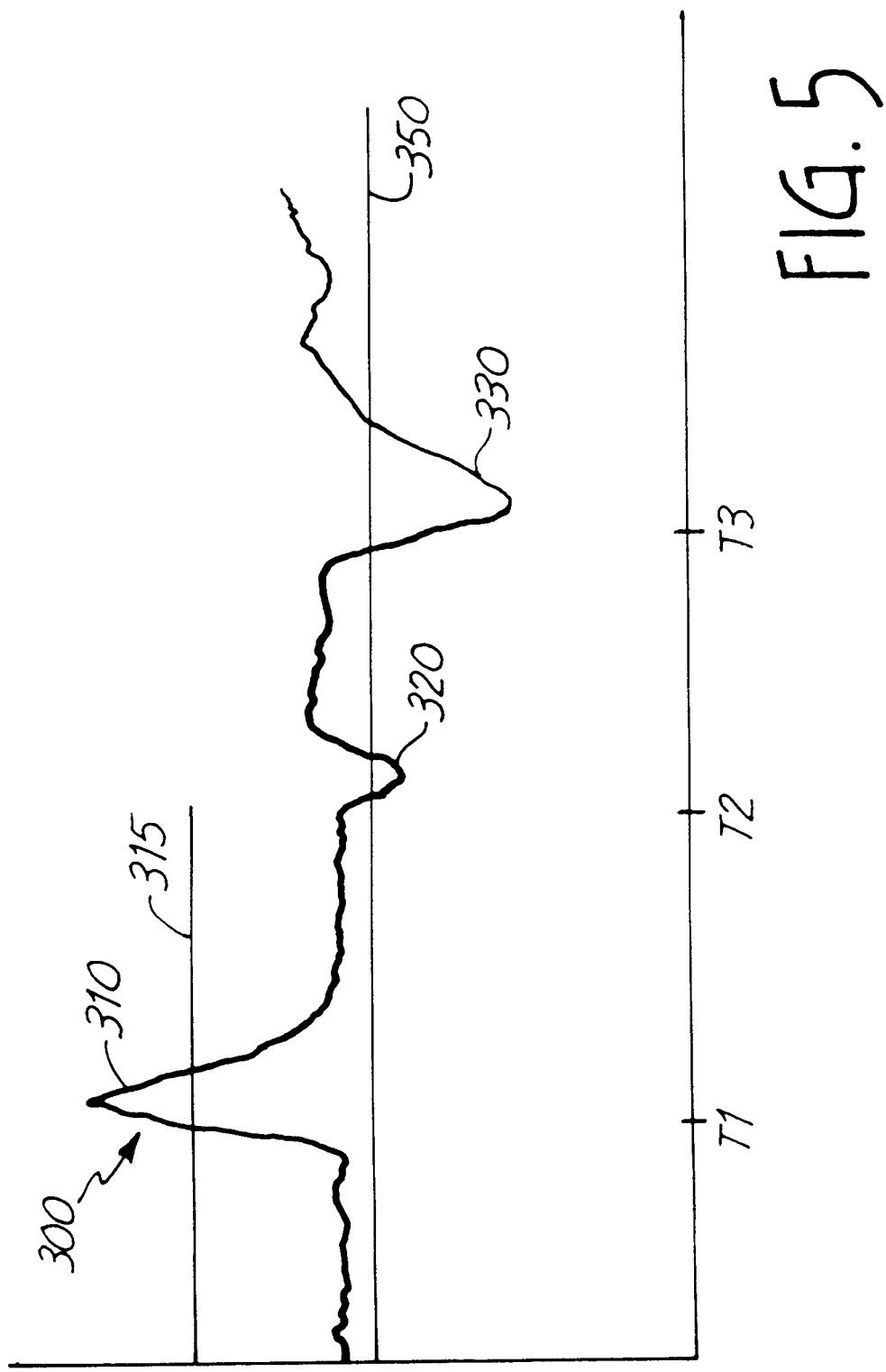

FIGS. 2 and 3 are block diagrams of a level transmitter 100. FIGS. 4 and 5 are plots of equivalent time Low Power Time Domain Reflectometry Radar (LTPDRR) transmit/ receive waveforms illustrating controllable threshold detector aspects of embodiments of the invention. Those skilled in the art will appreciate that the waveforms of FIGS. 4 and 5 may be inverted and still fall within the scope of the invention. Within housing 16, transmitter 100 includes transmit pulse generator 210, pulse receiver 220, threshold controller 230, dielectric constant calculator 240, and level computer 250. Transmitter 100 also includes termination 110. Threshold controller 230, dielectric constant calculator 240 arid level computer 250 can be implemented in microprocessor 255 as shown in FIG. 3. However, discrete circuitry for any of these functions can also be used. In embodiments in which these functions are embodied in microprocessor 255, transmitter 100 includes analog-to-digital converter 270. Transmitter 100 can include power supply arid input/output circuitry 260 (shown in FIG. 3) for powering transmitter 100 with power received over loop 20, and for communicating over loop 2C. Such communication can include transmitting information related to product heights over loop 20. Circuitry 260 can be adapted to provide the sole source of power for transmitter 100 with power received over loop 20.

Termination 110 can be of the type which is well known in the level transmitter art and can be any appropriate transmission line waveguide or antenna. A transmission line is a system of material boundaries forming a continuous path from one place to another and capable of directing transmission of electromagnetic energy along this path. In some embodiments, termination 110 is a twin lead antenna having Leads or conductors 115 and 120 connected at bottom region 125 and extendable into products 14 and 15 in tank 12, and optionally having launch plate 155. Termination 110 also be a monopole, coaxial, twin-line, single-line, microstrip, or radiative horn termination with any appropriate number of leads.

Transmit pulse generator 210 can be a low power microwave source coupled to termination 110. Generator 210 generates a microwave transmit pulse or signal which is transmitted along termination 110 into products 14, 15. The transmit pulse can be at any of a wide range of frequencies for example between about 250 MHz and about 20 GHz or more. In one embodiment the frequency of the transmit pulse is about 2 GHz. Fiducial pulse 310 of equivalent time waveform 300 (shown in FIGS. 4 and 5) can be created at launch plate 155 or by other mechanisms co designate the beginning of a transmit/receive cycle. A first portion of the transmit pulse microwave energy transmitted along leads 115 and 120 is reflected at first product interface 127 between air and product 14. A second portion of the transmit pulse microwave energy is reflected at interface 128 between product 14 and product 15. In FIGS. 4 and 5, pulse 320 of equivalent time waveform 300 represents microwave energy reflected at interface 127 between air and product 14, while pulse 330 represents microwave energy reflected at interface 128 between product 14 and product 15. In general, if product 14 has a dielectric constant which is less than the dielectric constant of product 15, the amplitude of pulse 330 can be larger than pulse 320.

Pulse receiver 220 can be a low power microwave receiver coupled to termination 110. Receiver 220 is adapted to receive the first reflected wave pulse corresponding to reflection of the first portion of the transmit pulse at product interface 127 (represented by pulse 320 in FIGS. 4 and 5). Receiver 220 is also adapted to receive the second reflected wave pulse corresponding to reflection of the second portion of the transmit pulse at the second product interface 128 (represented by pulse 330 in FIGS. 4 and 5). Using a known low power time domain reflectometry radar sampling technique, receiver 220 produces as an output equivalent time LPTDRR waveform 300.

Threshold controller 230 receives waveform 300 as an input. In embodiments in which threshold controller 230 and dielectric constant calculator 240 are embodied in microprocessor 255, analog-to-digital conversion circuitry 270 digitizes waveform 300. Threshold controller 230 generates thresholds 315, 340 and 350 for detection of fiducial pulse 310 and thus time $T_1$ at which pulse 310 was received, detection of reflected wave pulse 320 and thus time $T_2$ at which pulse 320 was received, and detection of reflected wave pulse 330 and thus time $T_3$ at which pulse 330 was received. Threshold value 315 used to detect fiducial pulse 310 can be a predetermined constant voltage, or can be automatically determined as a function of the peak amplitude of pulse 310 in a known manner. Threshold values 340, 350 can be calculated as a function of user entered data. Those skilled in the art will appreciate that threshold controller 230 can be embodied in software as an algorithm that looks for multiple pulses. Threshold controller 230 provides receive pulse threshold 340 shown in FIG. 4 at a level which is surpassed by pulse 330. Threshold controller 230 provides receive pulse threshold 350 shown in FIG. 5 at a level which is surpassed by pulse 320. Threshold controller 230 provides as an output to dielectric constant calculator 240 and to level computer 250, receive pulse information based upon to detection of reflected wave pulses 320 and/or 330 based upon a comparison of the reflected wave pulses 320, 330 to the respective threshold values.

Figure 6:
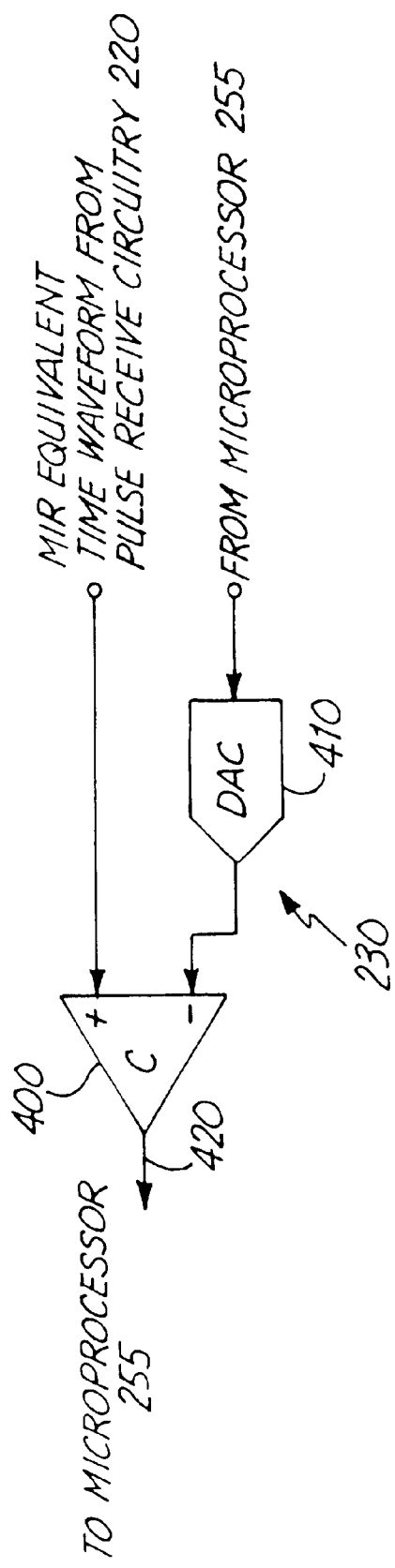
FIG. 6 is a schematic diagram of a controllable receive threshold circuit.

FIG. 6 illustrates a portion of threshold controller 230, implemented in discrete circuitry, which generates controllable thresholds such as thresholds 340 and 350. Threshold controller 230 includes comparator 400, having a first input from receiver 220 waveform 300 containing receive pulses 320 and 330. As a second input, comparator 400 receives the controllable analog threshold voltage which is provided from the output of digital-to-analog converter 410. Digital-to-analog converter 410 receives a digital input from microprocessor 255 representative of the desired threshold. The output 420 of comparator 400 is provided to dielectric constant calculator 240 and level computer 250 as an indication of the times that pulses 320 and 330 are received. During a first scan cycle in which waveform 300 is generated, converter 410 is controlled to provide threshold 350 for detection of pulse 320. During a subsequent scan cycle, converter 410 is controlled to provide threshold 340 for detection of pulse 330.

Dielectric constant calculator 240 in FIG. 2 is coupled to threshold controller 230 and is adapted tc calculate a dielectric constant of first product 14 in tank 12 as a function of the receive pulse output information provided by threshold controller 230. A method implemented by dielectric constant calculator 240 in calculating the dielectric constant is discussed below in detail with reference to FIGS. 7–9, Level computer 250 is coupled to threshold controller 230 and to dielectric constant calculator 240 and is adapted to calculate a level of the first product 14 and of the second product 15 using known mathematical functions to derive data from the reflected pulses. Such mathematical functions can, for example, operate upon pulse amplitude, pulse flight time, pulse slope, and pulse area. Computer 250 calculates the level of product 14 as a function of time $T_2$ of detection of first reflected wave pulse 320. Computer 250 can further calculate the level of product 15 as a function of time $T_3$ of detection of second reflected wave pulse 330 and of the calculated dielectric constant of product 14.

Using the controllable threshold detection, dielectric constant calculator 240 can calculate the dielectric constants of products, and combining this information with the multiple product interface timing information, the level of multiple products can be computed by level computer 250. The dielectric of the upper medium (oil in one particular example) is calculated by computer 250, for example using the following method.

The amplitude of the pulse reflected off of an interface with a material is proportional to the dielectric constant of the material according to the relationship shown in Equation 1.

$$\varepsilon_R \propto \frac{V_R}{V_T} \qquad \text{Eq. 1}$$

where:
$V_R$=the amplitude of the reflected pulse; and
$V_T$=the amplitude of the transmitted pulse.

METHODS

Figure 7:
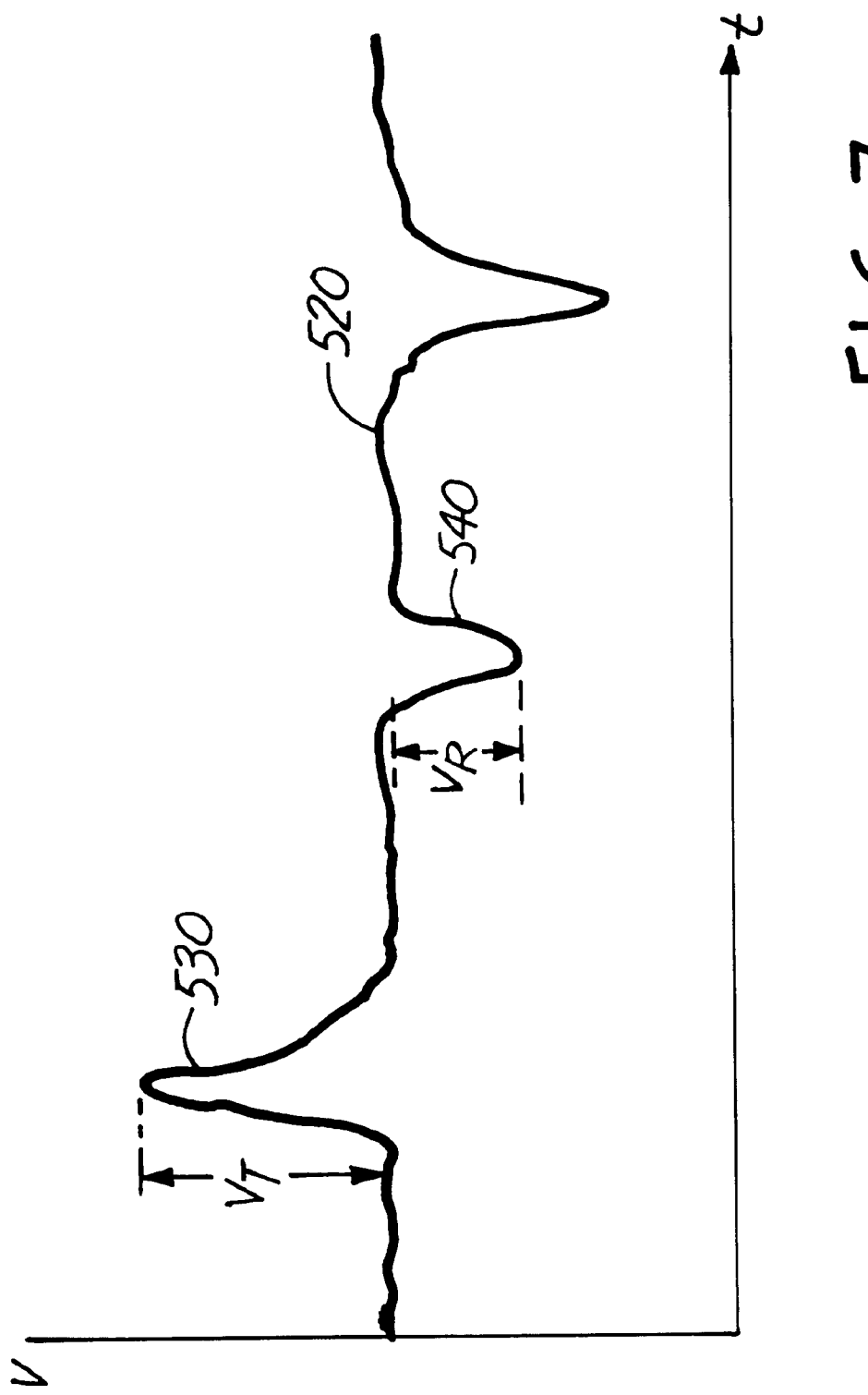
FIG. 7 is a plot illustrating an LPTDRR equivalent time waveform.
Figure 8:
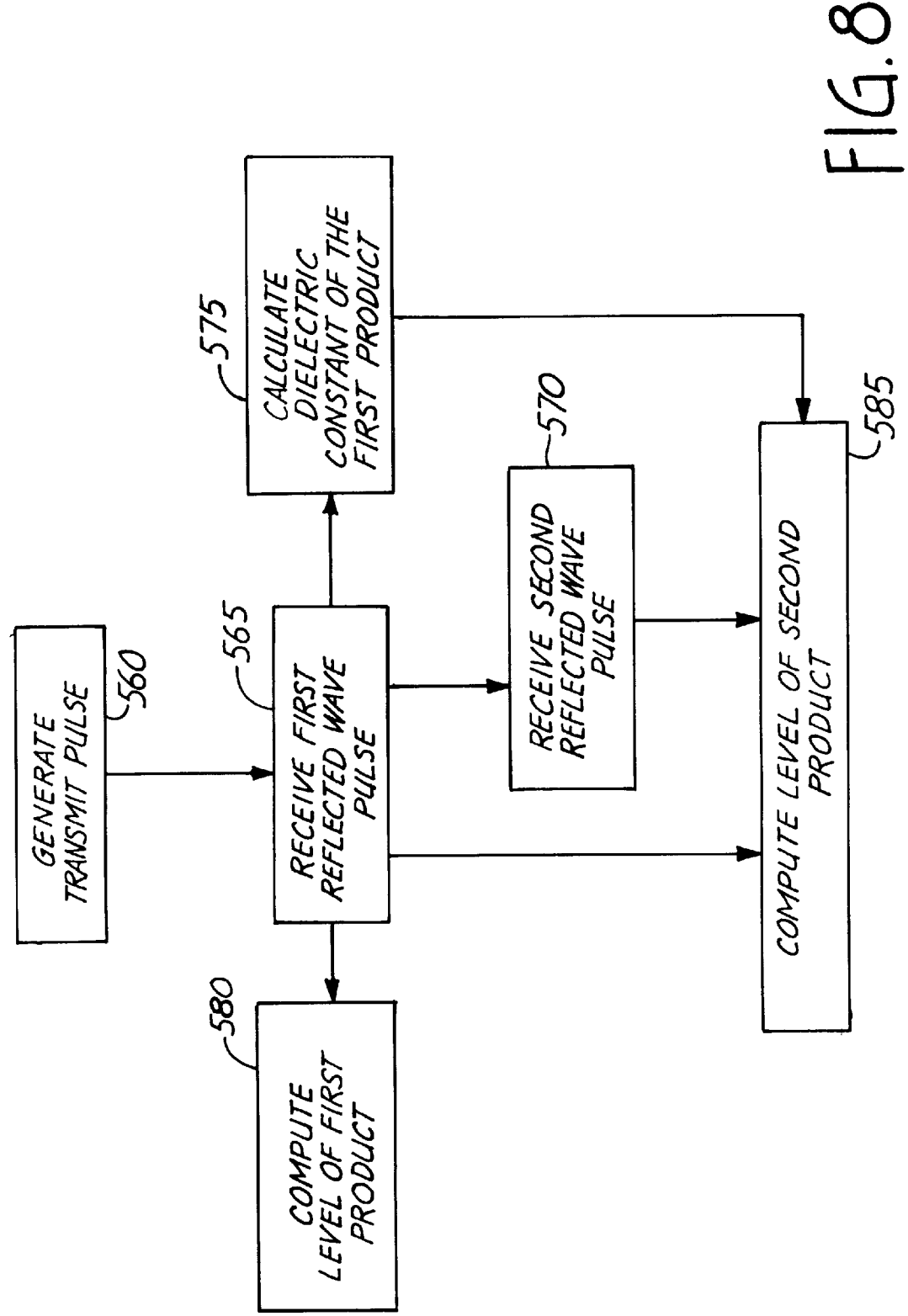
FIGS. 8 and 9 are flow diagrams illustrating methods implemented by a level transmitter in accordance with an embodiment of the invention.

A method of calculating the dielectric constant of product 14 with the relationship of Equation 1 uses threshold controller 230 to more precisely determine the transmitted and reflected pulse amplitudes. This method is used to calculate the levels of first product 14 and second product 15 within tank 12. The method is shown in the plot of FIG. 7, and is summarized in the flow diagram of FIG. 8. Those skilled in the art will appreciate that the plot of FIG. 7 may be inverted and still fall within the scope of the invention.

The method begins at block 560 with generating a transmit pulse. The transmit pulse is transmitted along the termination into the first and second products in the tank. At block 565, the first reflected wave pulse is received. The first reflected wave pulse corresponds to reflection of the first portion of the transmit pulse at the first product interface 127. At block 570, the second reflected wave pulse is received. The second reflected wave pulse corresponds to reflection of a second portion of the transmit pulse at the second product interface 128 formed between first product 14 and second product 15.

At block 575, the dielectric constant of the first product is calculated as a function of the first reflected wave pulse. As shown in equivalent time low power time domain reflectometry radar (LPTDRR) waveform 520 of FIG. 7, the transmit pulse (represented by fiducial pulse 530) has a transmit amplitude $V_T$, while the receive pulse 540 has a receive amplitude $V_R$. Either by digitizing the equivalent time LPTDRR waveform 520 with analog-to-digital converter 270 and analyzing the digitized signal with microprocessor 255, or by using digital-to-analog converter 410 to set comparator thresholds, the amplitude of the first reflected wave pulse is calculated, and the dielectric constant of first product 14 is calculated using Equation 1.

At block 580, the level of first product 14 is computed. The level of first product 14 is computed as a function of the first reflected wave pulse. As discussed above, the level of product 14 is typically computed as a function of a time of receipt of the first reflected wave pulse, and ultimately as a function of a first time period between transmission of the transmit pulse and receipt of the first reflected wave pulse.

At block 585, the level of second product 15 is computed. The level of second product 15 is computed as a function of the first and second reflected wave pulses and as a function of the calculated dielectric constant of first product 14. More specifically, the level of product 15 can be computed as a function of the calculated dielectric constant of first product 14 and as a function of a second time period between receipt of the first reflected wave pulse and receipt of the second reflected wave pulse. Ultimately, computation of the level of product 15 is also a function of the level of product 14.

Figure 9:
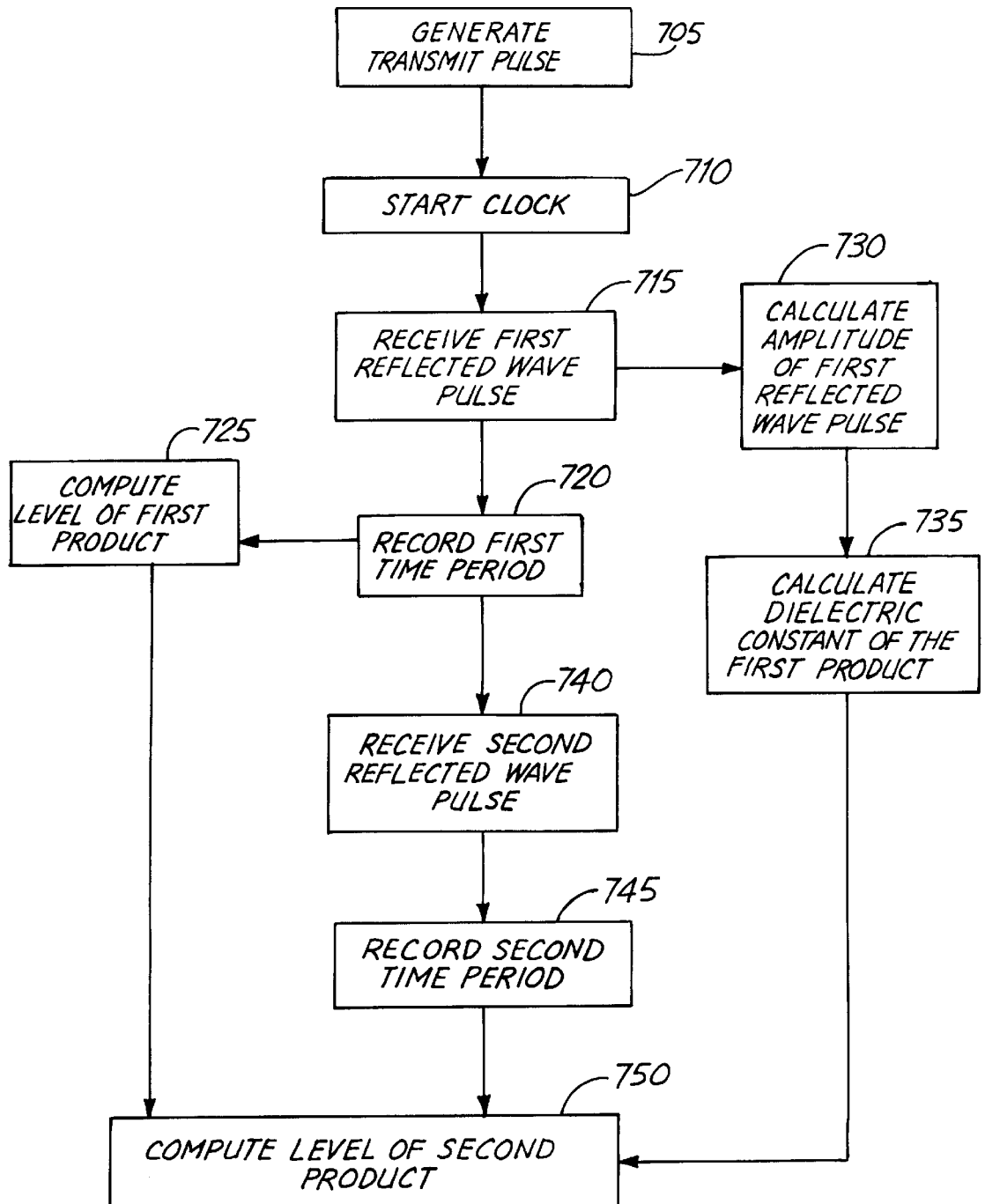

FIG. 9 illustrates a more particular method of computing the level of products 14 and 15 in tank 12. First, as shown at block 705, the transmit pulse is generated and transmitted along the termination into products 14 and 15. As shown at block 710, generation and/or transmission of the transmit pulse starts a clock or designates the beginning of one or more time periods. At block 715, the first reflected wave pulse is received, and at block 720 the first time period between transmission of the transmit pulse and receipt of the first reflected wave pulse is recorded. At block 725, the level of first product 14 is computed as a function of the first time period.

As shown at block 730, an amplitude of the first reflected wave pulse is calculated. At block 735, the dielectric constant of first product. 14 is calculated as a function of a comparison of the amplitude of the first reflected wave pulse to a reference amplitude. The reference amplitude is based upon the amplitude of the transmit pulse.

At block 740, the second reflected wave pulse is received, and at block 745 the second time period between receipt of the first reflected wave pulse and receipt of the second reflected wave pulse is recorded. At block 750, the level of second product 15 is computed. Computation of the level of second product 15 is performed as a function or the second time period, as a function of the calculated dielectric constant of the first product, and as a function of the computed level of the first product.

Although the present invention has been described with reference to preferred embodiments, workers skilled in the art will recognize that changes may be made in form and detail without departing from the spirit and scope of the invention.

What is claimed is:

1. A low power radar level transmitter providing multiple process product interface detection, the level transmitter comprising:

a termination positionable into first and second products in a tank;

a pulse generator coupled to the termination to generate a microwave transmit pulse which is transmitted along the termination into the first and second products in the tank, a first portion of the transmit pulse being reflected at a first product interface and a second portion of the transmit pulse being reflected at a second product interface, the second product interface being formed between the first and second products;

a pulse receiver coupled to the termination to receive a first reflected wave pulse corresponding to reflection of the first portion of the transmit pulse at the first product interface, and to receive a second reflected wave pulse corresponding to reflection of the second portion of the transmit pulse at the second product interface;

a threshold controller coupled to the pulse receiver to detect whether the first reflected wave pulse at least meets a first threshold value and whether the second reflected wave pulse at least meets a second threshold value, and provide receive pulse output information related to detection of the first and second reflected wave pulses;

a dielectric constant calculator coupled to the threshold controller to calculate a dielectric constant of the first product in the tank as a function of the receive pulse output information; and a level computer coupled to the threshold controller and to the dielectric constant calculator to calculate a level of the first product as a function of a time of detection of the first reflected wave pulse, and to calculate a level of the second product as a function of a time of detection of the second reflected wave pulse and as a function of the calculated dielectric constant of the first product.

2. The level transmitter or claim 1, wherein the termination line is a twin lead microwave transmission line.

3. The level transmitter of claim 1, wherein the level transmitter is coupled to a two-wire process control loop, and the level transmitter further comprises output circuitry coupled to the two-wire process control loop for transmitting information related to product height over the loop.

4. The level transmitter of claim 3, wherein the level transmitter further comprises power supply circuitry coupled to the two-wire process control loop for receiving power from the loop to provide the sole source of power for the transmitter.

5. The level transmitter of claim 4, wherein the process control loop is a 4–20 mA process control loop.

6. The level transmitter of claim 1, wherein the dielectric constant calculator calculates the dielectric constant of the first product as a function of a magnitude of the first reflected ware pulse relative to a magnitude of the transmit pulse.

7. The level transmitter of claim 1, and further comprising an analog-to-digital converter coupled to the pulse receiver and digitizing the first and second reflected wave pulses, wherein the threshold controller, the dielectric constant calculator and the level computer comprise a microprocessor coupled to the analog-to-digital converter to detect the digitized first and second reflected wave pulses, to calculate the dielectric constant of the first product, and to calculate the levels of the first and second products.

8. The level transmitter of claim 1, wherein the first and second thresholds are calculated as a function of user entered data.

9. The level transmitter of claim 1, wherein the threshold controller comprises:

a comparator having first and second inputs, the first input being coupled to the pulse receiver and receiving the first and second reflected wave pluses;

a microprocessor generating a digital output representative of a desired threshold; and a digital-to-analog converter coupled to the microprocessor and receiving the digital output, the digital-to-analog converter converting the digital output to an analog threshold voltage and providing the analog threshold voltage to the second comparator input.

10. The level transmitter of claim 1, wherein the pulse generator includes a low power microwave source.

11. The level transmitter of claim 10, wherein the pulse receiver includes a low power microwave receiver.

12. A low power radar level transmitter providing multiple process product interface detection, the level transmitter comprising:

a termination positionable into first and second products in a tank;

a low power microwave pulse generator coupled to the termination and generating a microwave transmit pulse which is transmitted along the termination into the first and second products in the tank;

a low power microwave pulse receiver coupled to the termination to receive reflected wave pulses corresponding to reflections of the transmit pulse;

dielectric constant calculating means, coupled to the low power microwave pulse receiver, for calculating a dielectric constant of the first product; and level computing means, coupled to the low power microwave pulse receiver and to the dielectric constant calculating means, for calculating levels of the first and second products.

13. A method of detecting multiple process product interfaces, the method comprising:

generating a transmit pulse which is transmitted along a termination into first and second products in a tank, receiving a first reflected wave pulse corresponding to reflection of a first portion of the transmit pulse at a first product interface;

receiving a second reflected wave pulse corresponding to reflection of a second portion of the transmit pulse at a second product interface, the second product interface being formed between the first and second products;

calculating a dielectric constant of the first product as a function of the first reflected wave pulse;

computing a level of the first product as a function of the first reflected wave pulse; and computing a level of the second product as a function of the first and second reflected wave pulses and as a function of the calculated dielectric constant of the first product.

14. The method of claim 13, wherein computing the level of the second product further comprises:

calculating a second time period between receipt of the first reflected wave pulse and receipt of the second reflected wave pulse; and computing the level of the second product as a function of the second time period, and as a function of the calculated dielectric constant of the first product, and as a function of the computed level of the first product.

15. The method of claim 14, wherein calculating the dielectric constant of the first product as a function of the first reflected wave pulse further comprises:

calculating an amplitude of the first reflected wave pulse; and calculating the dielectric constant of the first product as a function of a comparison of the amplitude of the first reflected wave pulse to a reference amplitude.

* * * * *

UNITED STATES PATENT AND TRADEMARK OFFICE
CERTIFICATE OF CORRECTION

PATENT NO.    : 6,198,424 B1  Page 1 of 1
DATED         : March 6, 2001
INVENTOR(S)   : Diede et al.

It is certified that error appears in the above-identified patent and that said Letters Patent is hereby corrected as shown below:

Column 7,
Line 33, change "ware" to -- wave --.

Column 8,
Line 25, change "," to -- ; --.

Signed and Sealed this

Sixth Day of November, 2001

*Attest:*

*Nicholas P. Godici*

NICHOLAS P. GODICI
*Attesting Officer*  *Acting Director of the United States Patent and Trademark Office*